(12) United States Patent
Davis (10) Patent No.: US 8,590,407 B2
(45) Date of Patent: Nov. 26, 2013

(54) CONTROL MOMENT GYROSCOPE ASSEMBLY AND METHOD FOR MAKING THE SAME

(75) Inventor: Porter Davis, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 683 days.

(21) Appl. No.: 12/782,547

(22) Filed: May 18, 2010

(65) Prior Publication Data

US 2011/0283826 A1 Nov. 24, 2011

(51) Int. Cl.
*G01C 19/06* (2006.01)
(52) U.S. Cl.
USPC ............................................................ 74/5 R
(58) Field of Classification Search
USPC .......... 74/5.4, 5.7, 5.8, 5.9, 5.95, 5 R; 29/447
See application file for complete search history.

(56) References Cited

U.S. PATENT DOCUMENTS

| | | | | |
|---|---|---|---|---|
| 1,265,899 A * | 5/1918 | Forster | .......................... | 74/574.4 |
| 1,365,473 A * | 1/1921 | Emmet | ...................... | 74/572.21 |
| 1,426,336 A * | 8/1922 | Sperry | ........................... | 74/5.95 |
| 2,244,603 A * | 6/1941 | Bauer | ............................. | 74/5 R |
| 2,771,778 A | 11/1956 | Ryberg | | |
| 2,815,667 A * | 12/1957 | Waldstein | ........................ | 74/5 F |
| 2,995,938 A * | 8/1961 | Brodersen et al. | ............... | 74/5.7 |
| 3,043,147 A * | 7/1962 | Will, Jr. | .......................... | 74/5 R |
| 3,274,666 A * | 9/1966 | Nordsieck | ..................... | 29/899.1 |
| 3,318,160 A * | 5/1967 | Erdley et al. | ..................... | 74/5.4 |
| 3,719,092 A | 3/1973 | Quinby | | |
| 3,742,769 A * | 7/1973 | Crutcher et al. | ................ | 74/5 R |
| 3,851,933 A | 12/1974 | Jacobson | | |
| 4,036,080 A * | 7/1977 | Friedericy et al. | ......... | 74/572.11 |
| 4,093,118 A * | 6/1978 | Sinn et al. | ........................ | 494/20 |
| 4,242,917 A * | 1/1981 | Bennett et al. | .................... | 74/5.5 |
| 4,343,203 A | 8/1982 | Jacobson et al. | | |
| 4,370,899 A * | 2/1983 | Swartout | .................... | 74/572.12 |
| 4,408,500 A * | 10/1983 | Kulkarni et al. | ........... | 74/572.12 |
| 4,468,269 A * | 8/1984 | Carey | ............................. | 156/175 |
| 5,692,414 A * | 12/1997 | Gregoire | .................... | 74/572.12 |
| 5,732,603 A * | 3/1998 | Swett et al. | ................. | 74/572.21 |
| 7,000,308 B2 * | 2/2006 | Fiske et al. | ....................... | 29/598 |
| 8,127,631 B2 * | 3/2012 | Gisler et al. | ..................... | 74/5 R |
| 2010/0064828 A1 * | 3/2010 | Gisler et al. | ................... | 74/5.95 |
| 2011/0023636 A1 * | 2/2011 | Atkins et al. | ................... | 74/5.95 |

* cited by examiner

*Primary Examiner* — Troy Chambers
*Assistant Examiner* — Valentin Craciun
(74) *Attorney, Agent, or Firm* — Ingrassia Fisher & Lorenz, P.C.

(57) ABSTRACT

A control moment gyroscope assembly including, but not limited to, a rotor that includes a shaft, a primary rim and a web that connects the shaft to the primary rim. The rotor is made from a metal material and is adapted to spin about the shaft. The control moment gyroscope assembly further includes a secondary rim that is made of the metal material and that is disposed around the rotor. The secondary rim is configured to compress the rotor in the direction of the shaft.

17 Claims, 7 Drawing Sheets

CONTROL MOMENT GYROSCOPE ASSEMBLY AND METHOD FOR MAKING THE SAME

TECHNICAL FIELD

The present invention generally relates to gyroscopes and more particularly to control moment gyroscopes for spacecraft.

BACKGROUND

Gyroscopes are spinning bodies, such as wheels or discs, that generate angular momentum as they spin about an axle. The principles of conservation of angular momentum make gyroscopes resistant to torques that are applied to their axles. Because of their tendency to reliably remain in a given orientation when spinning, gyroscopes have been used in various navigation systems.

One common application has been to use gyroscopes to control the movement of spacecraft operating in a weightless environment, such as that encountered while in orbit around the earth. The attitude of a spacecraft is controlled and or maneuvered gyroscopically by following the law of conservation of momentum. CMGs exchange their momentum with the momentum of the spacecraft. They do this by torquing the gimbal axis of the CMG to change the direction of the momentum vector of the CMG which then changes the momentum of the spacecraft. This changes the velocity of the spacecraft. Because gyroscopes are resistant to changes in the angle of their axles, a torque applied to the axle by a spacecraft operating in zero gravity will result in movement of the spacecraft around the gyroscope. In this manner, the attitude and orientation of the spacecraft can be controlled. Gyroscopes that are used for this purpose are known as control moment gyroscopes. The faster that a control moment gyroscope spins and the more mass that a control moment gyroscope has, the more resistant a control moment gyroscope will be to a torque applied to its axle.

The control moment gyroscope typically includes a rotor disposed within a housing. The rotor typically includes a shaft that serves as the rotor's axle, a rim that has a circular or ring-like configuration and which comprises the majority of the rotor's mass, and a web that connects the rim to the shaft. The shaft is configured to mount the rotor to the housing in a manner that permits the rotor to spin with respect to the housing.

The web may be is connected to the shaft and to the rim by one or more weld joints. As the rotor spins, the weld joints are placed in tension. The maximum speed at which the rotor can spin is therefore limited by the amount of tension stress that the weld joints can tolerate. Additionally, when torque is applied to the shaft to move the spacecraft, the weld joints alternately cycle through tension and compression due to the spinning of the rotor. Such cycling through alternate states of tension and compression can fatigue the weld joints and reduce their tolerance to tension which can, in turn, reduce the maximum rotational speed of the rotor.

BRIEF SUMMARY

Embodiments of a control moment gyroscope assembly and a method for making a control moment gyroscope assembly are disclosed herein.

In an embodiment, the control moment gyroscope assembly includes, but is not limited to, a rotor that includes a shaft, a primary rim and a web that connects the shaft to the primary rim. The rotor is made of a metal material and is adapted to spin about the shaft. The control moment gyroscope assembly also includes a secondary rim that is made of the metal material and that is disposed around the rotor. The secondary rim is configured to compress the rotor in the direction of the shaft.

In another embodiment, the control moment gyroscope assembly includes, but is not limited to, a rotor that includes a shaft, a primary rim, a web disposed between the shaft and the primary rim, a first weld joint joining the web to the shaft and a second weld joint joining the web to the primary rim. The rotor is made of steel and is adapted to spin about the shaft. The control moment gyroscope assembly further includes a secondary rim that is made of steel and that is thermally coupled to the primary rim such that the primary rim and the secondary rim are in an interference fit with respect to one another. The interference fit causes the secondary rim to compress the rotor in the direction of the shaft such that the first weld joint and the second weld joint are in compression as the rotor spins.

In another embodiment, a method for assembling the control moment gyroscope includes, but is not limited to, the step of providing a rotor and a secondary rim. The rotor and the secondary rim are each made of steel. The rotor includes a primary rim that has an outer diameter. The secondary rim has an inner diameter. The outer diameter exceeds the inner diameter when the primary rim and the secondary rim are at the same temperature. The method also includes the step of heating the secondary rim until the secondary rim expands to a state where the inner diameter exceeds the outer diameter. The method also includes positioning the secondary rim around the primary rim while the inner diameter exceeds the outer diameter. The method also includes the step of cooling the secondary rim, causing the secondary rim to contract around the primary rim and thereby create an interference fit between the primary rim and the secondary rim that compresses the primary rim in an inward direction.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Embodiments of a control moment gyroscope and methods for making a control moment gyroscope are disclosed herein. It should be understood that the teachings disclosed herein are not limited to applications with control moment gyroscopes, but instead are equally applicable to Reaction Wheel Assemblies (RWAs) and momentum wheels. The control moment gyroscope includes a housing, a rotor, and various machine components. The housing is configured to enclose the rotor and to support the rotor in a manner that permits the rotor to spin with respect to the housing. The rotor comprises steel and includes a shaft, a rim (hereinafter, the "primary rim") and a web that links the shaft to the primary rim. The shaft serves as an axle to support the rotor in a spinning relationship with the housing. The primary rim is generally configured as a ring and comprises a majority of the mass of the rotor. The web is attached to the shaft and to the primary rim via welded joints (hereinafter "weld joints"). The machine components are attached to the housing and are configured to spin the rotor within the housing.

A secondary rim, generally configured as a ring and comprising steel, is mounted to the rotor adjacent an outer surface of the primary rim. The primary rim has an outer diameter that exceeds the inner diameter of the secondary rim. Thus, the secondary rim and the primary rim are arranged in an interference fit with respect to one another. Due to the interference fit, the secondary rim inwardly compresses the primary rim which, in turn, compresses the weld joints that hold the primary rim to the web and that hold the web to the shaft. In some embodiments, the compression acting on the primary rim is sufficient to ensure that the weld joints remain in compression throughout the entire operational range of rotational speeds of the rotor. By maintaining the weld joints in a state of compression, the rotor is enabled to spin at speeds that are greater than could be achieved without the secondary rim. This, in turn, enables the rotor to generate greater angular momentum which provides greater torque for maneuvering the spacecraft. Additionally, the compression of the weld joints greatly reduces, and in some cases, eliminates the occurrence of the weld joint fatigue which would otherwise occur as torque is applied to the shaft of the rotor during spacecraft maneuvers. Furthermore, other elements of the primary rim and the web will also be in compression and will gain similar advantage. This is helpful where there are places of high stress.

Because both the primary rim and the secondary rim are made of steel, the two components can be welded together. Such welding fixes the secondary rim with respect to the primary rim and inhibits the secondary rim from moving with respect to the primary rim, or from becoming displaced from the primary rim as the rotor spins at elevated rates of rotation. This fixed relationship greatly enhances the stability of the rotor and is made possible by the fact that the primary rim and the secondary rim are both made of the same metal material. The secondary rim could not be effectively welded to the primary rim if the two rims were comprised of differing metal materials. It should be understood that, while the discussion contained herein described the various components of the rotor and the secondary rim as being made of steel, materials other than steel could be used providing they have similar or even better high strength features.

One method of mounting the secondary rim to the primary rim is to thermally couple the rims together. This entails heating the secondary rim and causing it to expand until its inner diameter exceeds the outer diameter of the primary rim. In some embodiments, the primary rim is simultaneously cooled, causing it to contract and thereby facilitate the mounting of the secondary rim onto the primary rim. Once the secondary rim is in place about the primary rim, the secondary rim is allowed to cool (and the primary rim is allowed to warm if it has been cooled), thus causing the secondary rim to contract around the primary rim. This contraction of the secondary rim back to its pre-heating dimension creates the interference fit discussed above and causes the secondary rim to inwardly compress the primary rim.

A greater understanding of the embodiments of the control moment gyroscope assembly and the methods for making the control moment gyroscope assembly may be obtained through a review of the illustrations accompanying this application together with a review of the detailed description that follows.

Figure 1:
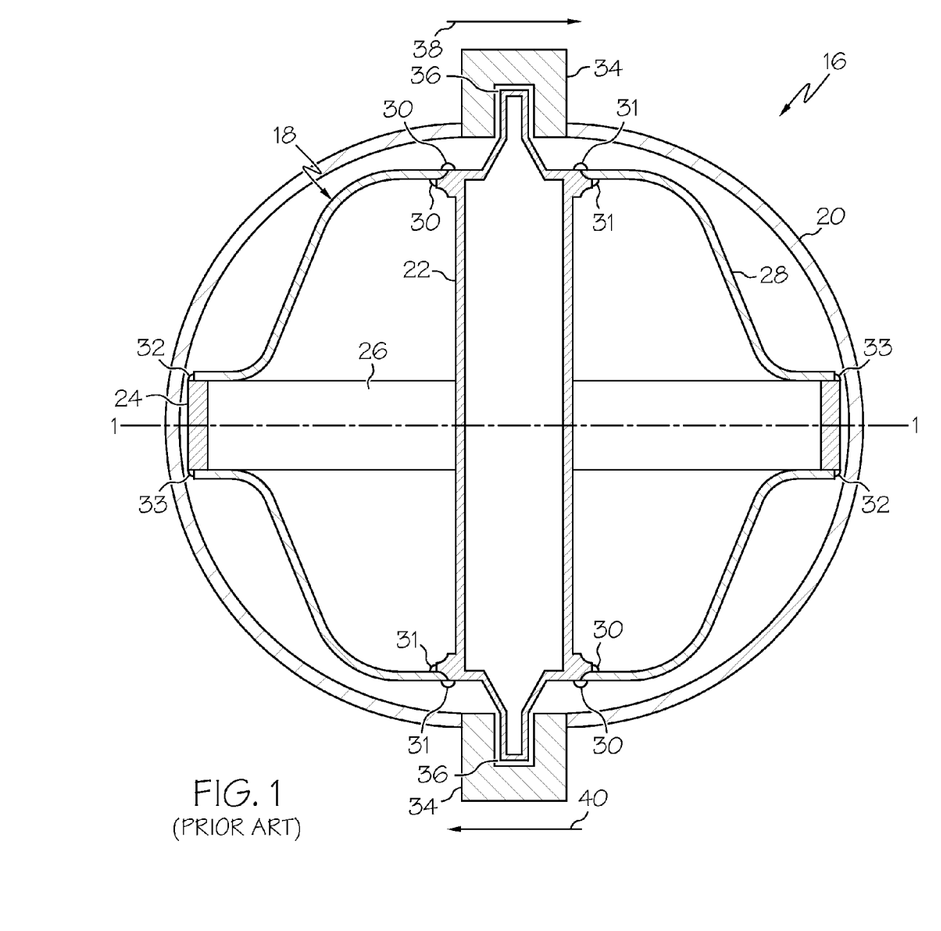
FIG. 1 is a simplified cross sectional view of a prior art control moment gyroscope.

FIG. 1 is a simplified cross sectional view of a prior art control moment gyroscope 16. Prior art control moment gyroscope 16 includes a rotor 18 and a housing 20. Rotor 18 is made of steel and includes a shaft 22, a primary rim 24 having an underside 26, and a web 28 joining primary rim 24 to shaft 22. Web 28 is generally configured as a shell and is attached to shaft 22 via weld joints 30 and 31 and to primary rim 24 via weld joints 32 and 33. Housing 20 includes machine components 34 which each include a bearing 36. Each bearing 36 is configured to receive an end portion of shaft 22. One or both machine components 34 include a motor (not shown) that engages the end portion(s) of shaft 22 and which cause rotor 18 to rotate.

As illustrated, rotor 18 employs only a single steel rim, primary rim 24. Primary rim 24 is not inwardly compressed and therefore does not inwardly compress weld joints 30, 31, 32 or 33. Accordingly, as rotor 18 spins, weld joints 30, 31, 32, and 33 are placed in tension. As torque is applied to prior art control moment gyroscope 16, as indicated by arrows 38 and 40, some of the weld joints will be placed in tension and some will be placed in compression. With respect to the weld joints located above line 1-1, as torque is applied in the direction indicated by arrow 38, initially weld joints 30 and 32 will be placed in tension while weld joints 31 and 33 will be placed in compression. When rotor 18 rotates one hundred and eighty degrees, the situation will reverse—weld joints 30 and 32 will be placed in compression while weld joints 31 and 33 will be placed in tension. When rotor 18 rotates an additional one hundred and eighty degrees, the situation will reverse again. This cycle of tension and compression will repeat itself until the torque indicated by arrow 38 abates. This cycling of the weld joints between tension and compression can, over time, fatigue the weld joints.

Figure 2:
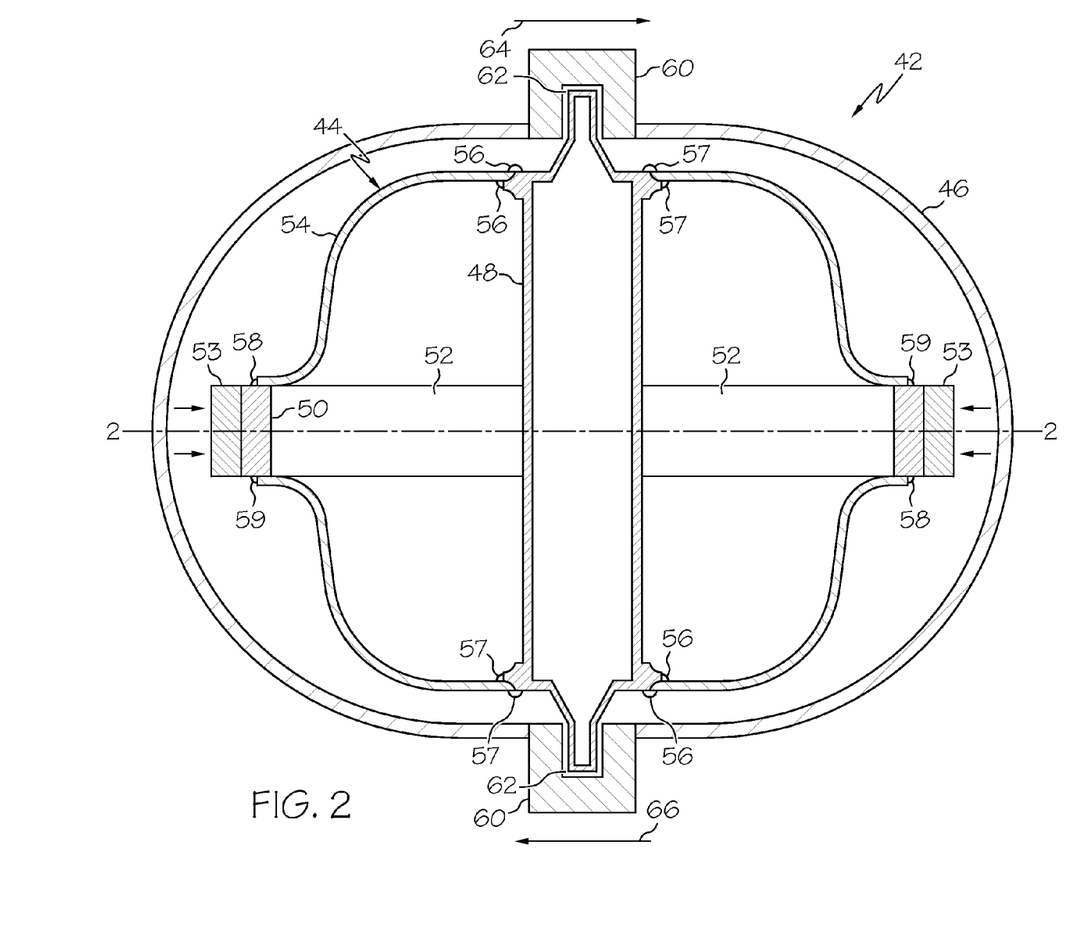
FIG. 2 is a simplified cross sectional view of an embodiment of a control moment gyroscope made in accordance with the teachings of the present disclosure.

FIG. 2 is a simplified cross sectional view of an embodiment of a control moment gyroscope 42 made in accordance with the teachings of the present disclosure. Control moment gyroscope 42 includes a rotor 44 and a housing 46. Rotor 44 is made of steel and includes a shaft 48, a primary rim 50 having an underside 52, and a web 54 joining primary rim 50 to shaft 48. Web 54 is generally configured as a shell and is attached to shaft 48 via weld joints 56 and 57 and to primary rim 50 via weld joints 58 and 59. Housing 46 includes machine components 60 which each include a bearing 62. Each bearing 62 is configured to receive an end portion of shaft 48. One or both machine components 60 include a motor (not shown) that engages the end portion(s) of shaft 48 and which cause rotor 44 to rotate.

Rotor 44 further includes a secondary rim 53 positioned adjacent primary rim 50 and thermally coupled thereto to create an interference fit between primary rim 50 and secondary rim 53. Accordingly, secondary rim 53 inwardly compresses primary rim 50 and, by extension, inwardly compresses weld joints 56, 57, 58, and 59. This compression of weld joints 56, 57, 58, and 59 permits rotor 44 to spin at higher speeds than would be possible without such compression. In the absence of this compression, the rotational speed of rotor 44 would be limited by the ability of weld joints 56, 57, 58, and 59 to tolerate tension. Because weld joints 56, 57, 58, and 59 do not enter a state of tension, their ability to tolerate tension is eliminated as a limiting factor on the rotational speed of rotor 44. It should be understood that weld joints may not be employed in all designs. Rather, the primary rim, the web and the shaft may be integral, i.e., made from one piece of metal. In such a case, high stress will develop in the web near the shaft and under the primary rim. In such a case, the secondary rim will also function to reduce stresses in this design as it does in welded configurations.

The presence of secondary rim 53 also avoids the cycling of weld joints 56, 57, 58, and 59 through alternating states of compression and tension when a torque, represented by arrows 64 and 66, is applied to control moment gyroscope 42. With respect to the portion of control moment gyroscope 42 disposed above line 2-2, immediately prior to the application of the torque, weld joints 56, 57, 58, and 59 are each in a state of compression due to the interference fit between secondary rim 53 and primary rim 50. When the torque represented by arrow 64 is applied to control moment gyroscope 42, weld joints 56 and 58 experience a diminution in compression, but do not enter a state of tension. Correspondingly, weld joints 57 and 59 experience an increase in compression when the torque is applied. As rotor 44 rotates one hundred and eighty degrees, the situation reverses—weld joints 56 and 58 experience an increase in compression while weld joints 57 and 59 experience a diminution in compression, but do not enter a state of tension. Upon the continued rotation of rotor 44 by an additional one hundred and eighty degrees, the situation reverses again. By maintaining the weld joints in a state of compression, they avoid entering a state of tension even when a torque is applied to rotor 44. Because the weld joints do not cycle through states of compression and tension, the fatigue experienced by weld joints 30, 31, 32, and 33 of prior art control moment gyroscope 16 (see FIG. 1) is reduced or avoided altogether.

Figure 3:
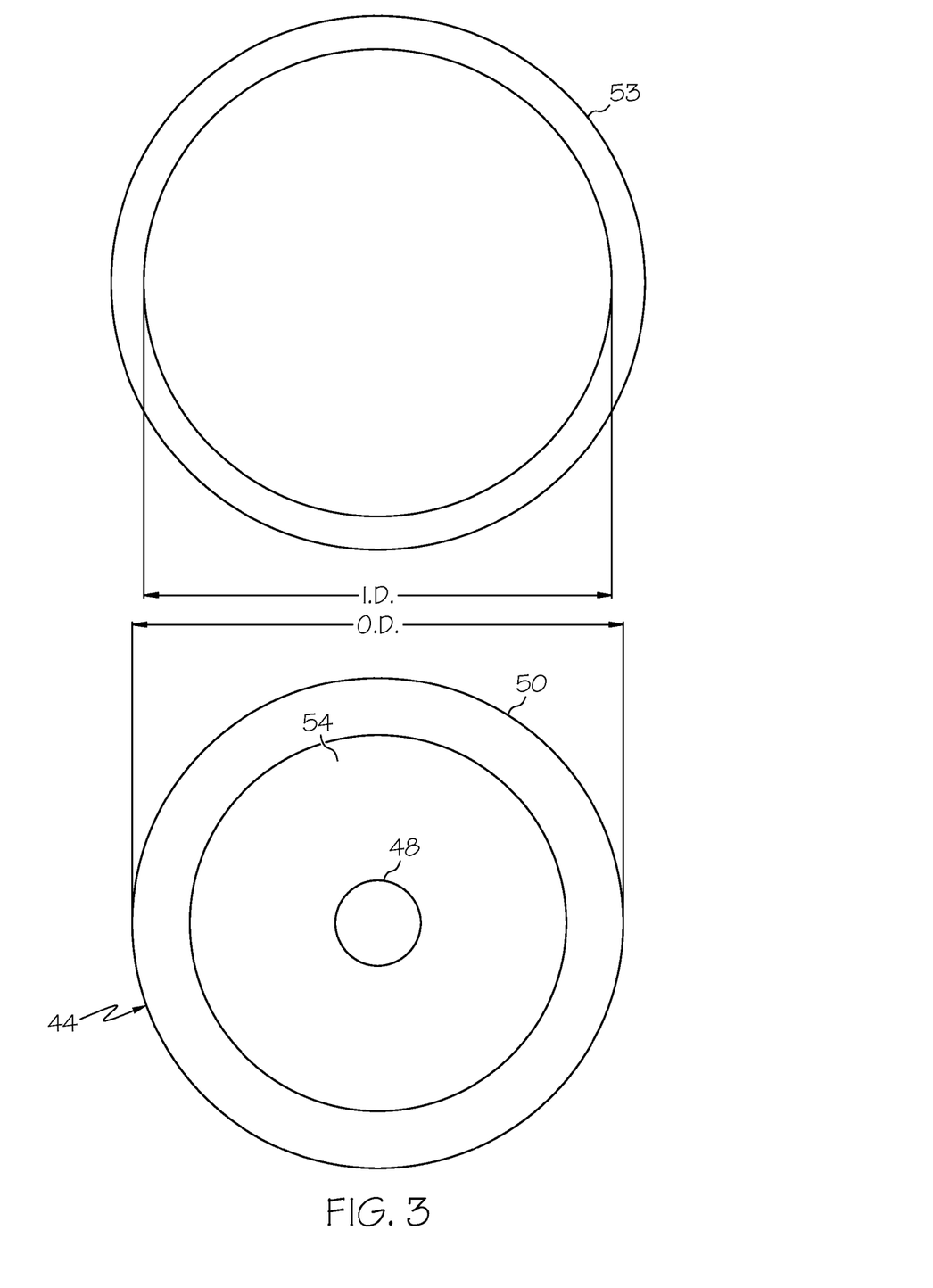
FIG. 3 is a simplified plan view illustrating the relative diameters of a primary rim and a secondary rim.

FIG. 3 is a simplified plan view illustrating the relative diameters of primary rim 50 and secondary rim 53. As illustrated, when primary rim 50 and secondary rim 53 are at the same temperature, primary rim 50 has an outer diameter O.D. that is greater than the inner diameter I.D. of secondary rim 53.

Figure 4A:
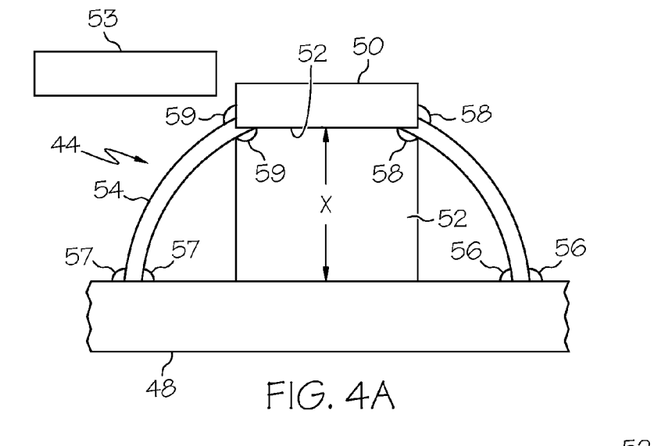
FIGS. 4A-C are a series of fragmentary schematic cross-sectional views schematically illustrating the interference fit between the secondary and the primary rims and the resulting compression on the primary rim.
Figure 4B:
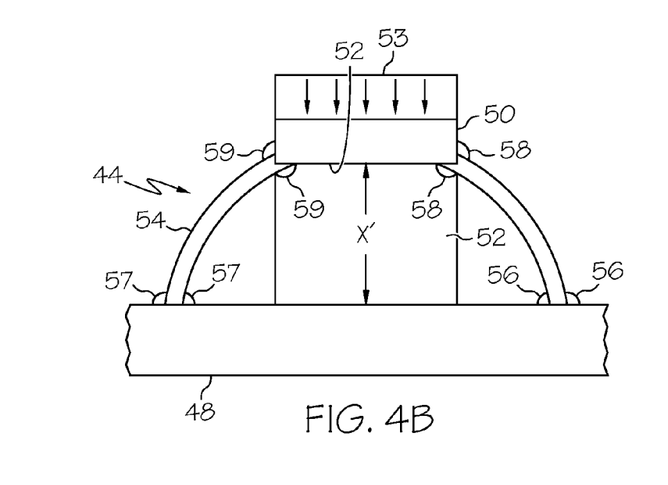
Figure 4C:
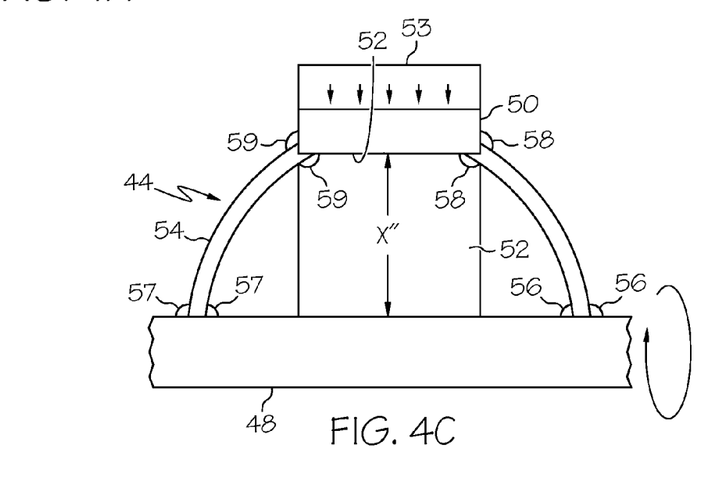

FIGS. 4A-C are a series of fragmentary, schematic cross sectional views schematically illustrating the interference fit between secondary rim 53 and primary rim 50 and the resulting compression on primary rim 50. In FIG. 4A, primary rim 50 is illustrated at a position that is representative of its distance from shaft 48 when primary rim 50 is not constrained by secondary rim 53. Secondary rim 53 is illustrated in close proximity to primary rim 50 and at a position with respect to shaft 48 that is representative of its radial distance from shaft 48. Distance X represents the radial distance of underside 52 from shaft 48 prior to thermally coupling secondary rim 53 around primary rim 50.

In FIG. 4B, rotor 44 is not spinning, secondary rim 53 has been mounted to primary rim 50 and secondary rim 53 is compressing primary rim 50 inwardly towards shaft 48. A series of elongate arrows pointing in a downward direction have been illustrated to depict the compressive force exerted by secondary rim 53 on primary rim 50. This compression, in turn, compresses weld joints 56, 57, 58, and 59. The distance from underside 52 to shaft 48 has diminished from X to X' due to the compression.

In FIG. 4C, rotor 44 is spinning. This causes primary rim 50 and secondary rim 53 to expand under the centrifugal force caused by the rotation of rotor 44. This expansion causes the distance from underside 52 to shaft 48 to expand from X' to X". As primary rim 50 and secondary rim 53 expand, secondary rim 53 continues to apply a compressive force on primary rim 50, although such compressive force is smaller than the compressive force applied by secondary rim 53 in FIG. 4B. This is because the centrifugal force acting on secondary rim 53 is greater than the centrifugal force acting on primary rim 50 due to secondary rim 53 being positioned a greater distance from the axis of rotation (shaft 48) than primary rim 50.

An additional consideration is thermal expansion. Rotor 44 will typically heat up as it spins. Its increased temperature will correspond to the rate of rotation. This heat will cause both primary rim 50 and secondary rim 53 to expand. Accordingly, constructing primary rim 50 and secondary rim 53 out of the same material ensures that these two components will expand at the same rate, thereby making the compressive force acting on primary rim 50 more predictable than it would be if different materials were used.

Figure 5:
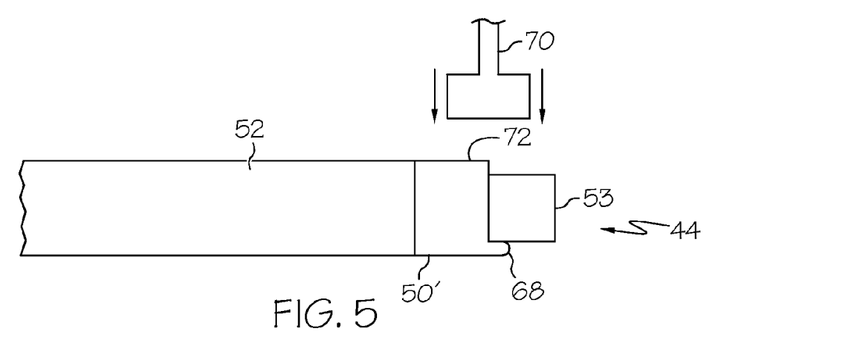
FIG. 5 is a fragmentary side view of a portion of the rotor of FIG. 2 schematically illustrating an initial stage of a swaging process to secure the secondary rim to the primary rim.

FIG. 5 is a fragmentary side view of a portion of rotor 44 schematically illustrating an initial stage of a swaging process to secure secondary rim 53 to a primary rim 50'. As illustrated, primary rim 50' includes a shoulder 68. Shoulder 68 serves to prevent secondary rim 53 from sliding past an end of primary rim 50' when secondary rim 53 is thermally coupled to primary rim 50'. Once secondary rim 53 is seated against shoulder 68, a press 70 is compressed against a side 72 of primary rim 50'. The force applied by press 70 is sufficient to deform or swage side 72 to form a lip which inhibits secondary rim 53 from moving laterally with respect to primary rim 50'.

Figure 6:
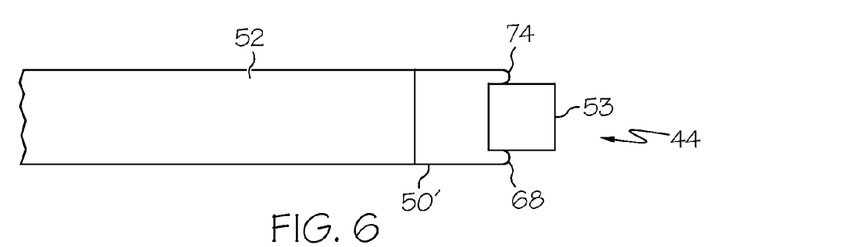
FIG. 6 is a fragmentary side view of the portion of the rotor depicted in FIG. 5 schematically illustrating an arrangement wherein the secondary rim is secured to the primary rim via a swaged lip of the primary rim.

FIG. 6 is a fragmentary side view of the portion of rotor 44 depicted in FIG. 5 schematically illustrating an arrangement wherein secondary rim 53 is secured to primary rim 50' via a swaged lip 74 of primary rim 50'. Swaged lip 74 and shoulder 68 cooperate to ensure that there is no lateral movement of secondary rim 53 with respect to primary rim 50' as rotor 44 rotates.

Figure 7:
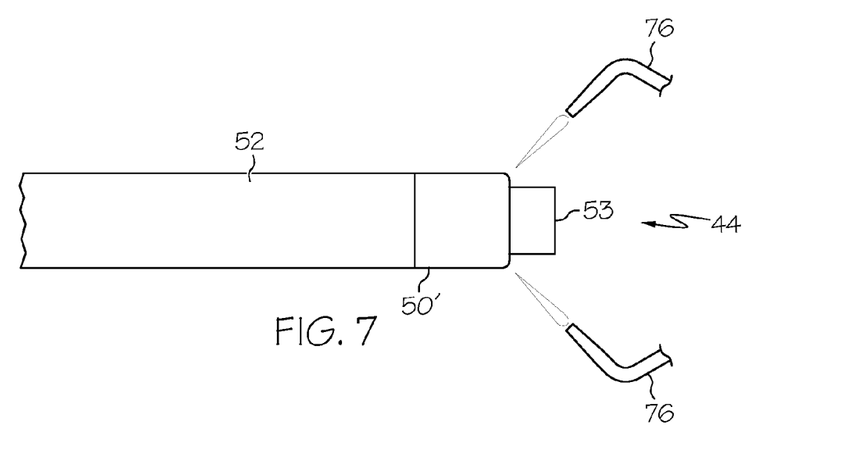
FIG. 7 is a fragmentary side view of a portion of the rotor of FIG. 2 schematically illustrating an initial stage of a welding process to secure the secondary rim to the primary rim.

FIG. 7 is a fragmentary side view of a portion of rotor 44 schematically illustrating an initial stage of a welding process to secure secondary rim 53 to primary rim 50. Once secondary rim 53 has been thermally coupled to primary rim 50, welding torches 76 are used to melt portions of secondary rim 53 and primary rim 50 such that their respective melted portions combine to form a weld joint.

Figure 8:
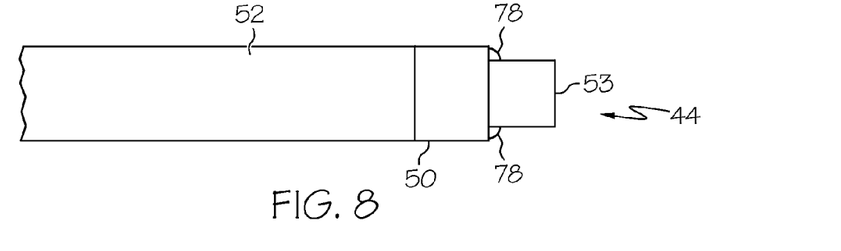
FIG. 8 is a fragmentary side view of the portion of the rotor depicted in FIG. 7 schematically illustrating an arrangement wherein the secondary rim is secured to the primary rim via a welded joint.

FIG. 8 is a fragmentary side view of the portion of rotor 44 depicted in FIG. 7 schematically illustrating an arrangement wherein secondary rim 53 is secured to primary rim 50 via a welded joint 78. Welded joint 78 inhibits lateral movement of secondary rim 53 with respect to primary rim 50 as rotor 44 rotates. Such a welded arrangement is possible because primary rim 50 and secondary rim 53 are both comprised of the same material.

Figure 9:
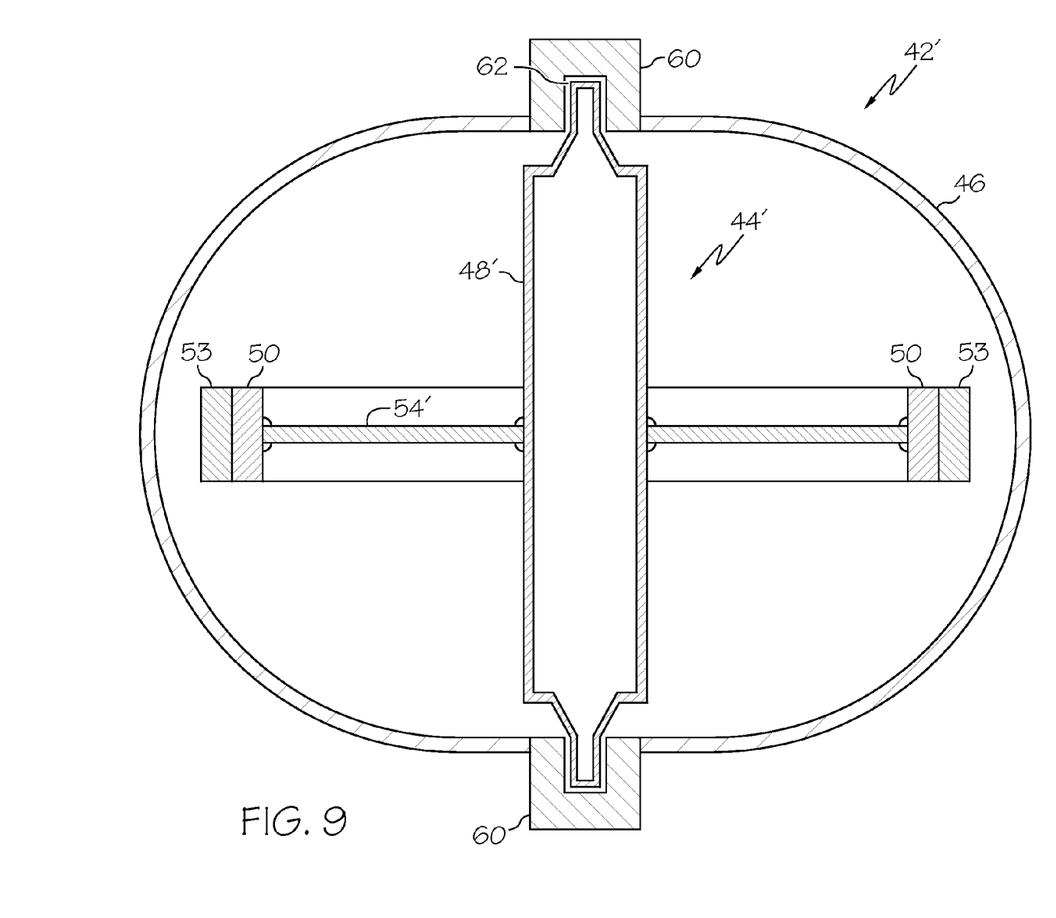
FIG. 9 is a simplified cross sectional view of an alternate embodiment of a control moment gyroscope made in accordance with the teachings of the present disclosure.

FIG. 9 is a simplified cross sectional view of an alternate embodiment of a control moment gyroscope 42' made in accordance with the teachings of the present disclosure. With continuing reference to FIG. 2, control moment gyroscope 42' is similar to control moment gyroscope 42, the primary difference being that web 54' of control moment gyroscope 42' is configured as a disc whereas web 54 of control moment gyroscope 42 is configured as a shell having a generally oval configuration. Configuring the web as a disc rather than a shell may permit rotor 44' to spin more rapidly than rotor 44.

Figure 10:
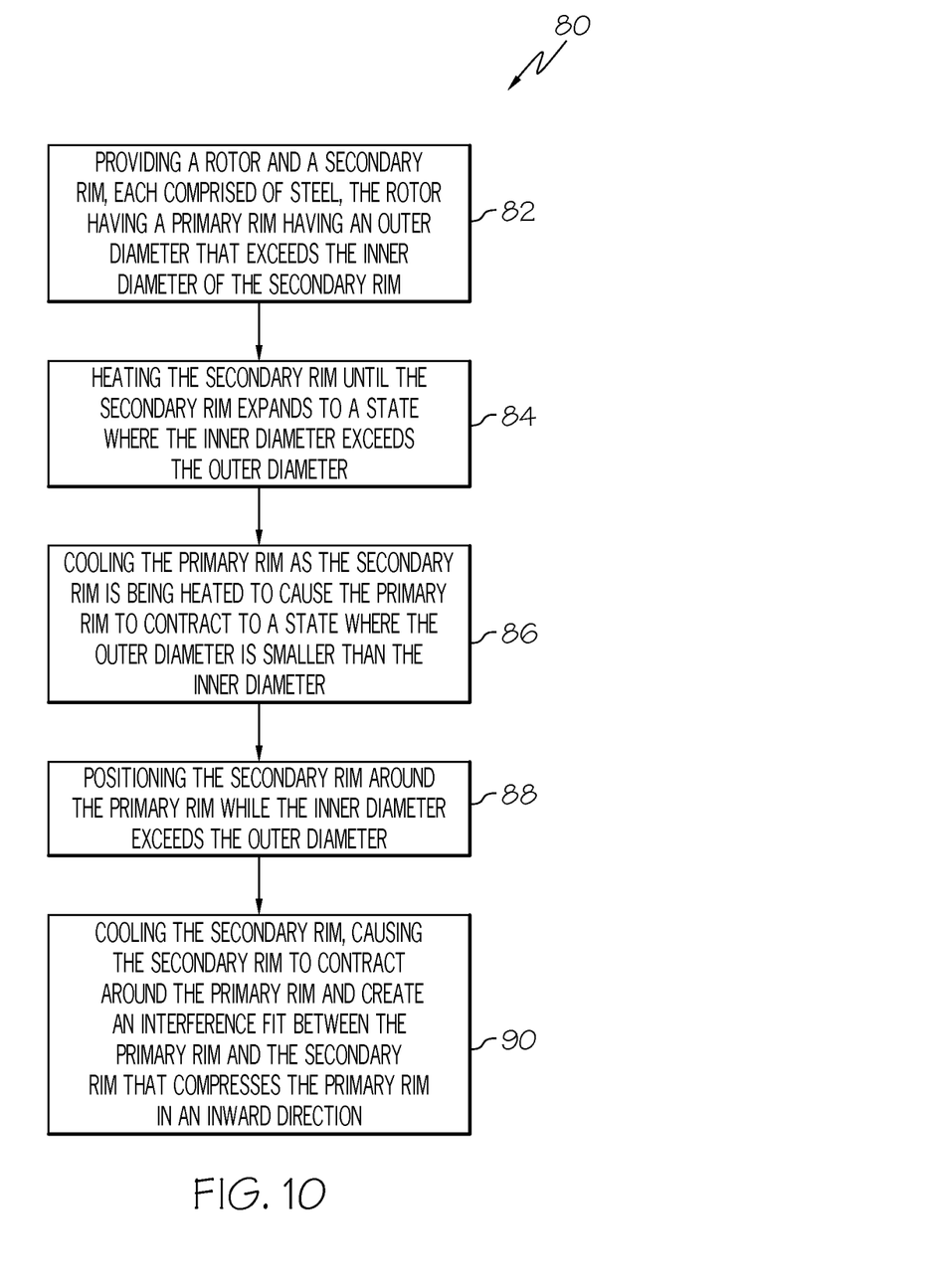
FIG. 10 is a block diagram illustrating the steps of an embodiment of a method for making a rotor suitable for use in a control moment gyroscope in accordance with the teachings of the present disclosure.

FIG. 10 is a block diagram illustrating the steps of an embodiment of a method 80 for making a rotor suitable for use in a control moment gyroscope in accordance with the teachings of the present disclosure.

At block 82, a rotor and a secondary rim are provided, each constructed of steel. The rotor includes a primary rim having an outer diameter that is smaller than an inner diameter of the secondary rim.

At block 84, the secondary rim is heated until it expands to a state where its inner diameter exceeds the outer diameter of the primary rim. Such heating of the secondary rim may be accomplished through any suitable means including, for example, heating the secondary rim in a furnace.

At block 86, the primary rim is cooled while the secondary rim is heated. Cooling the primary rim causes it to contract, thus reducing its outer diameter, and thereby facilitating the mounting of the secondary rim to the primary rim. The cooling of the primary rim can be accomplished by any suitable means including, for example, immersing the primary rim in a cooled liquid. In other embodiments of method 80, this cooling step may be omitted.

At block 88, once the secondary rim has expanded and the primary rim has contracted to the point where the inner diameter of the secondary rim is larger than the outer diameter of the primary rim, the secondary rim is positioned around the primary rim.

At block 90, the secondary rim is allowed to cool and the primary rim is allowed to warm up. As the secondary rim cools it will contract and as the primary rim warms up, it will expand. Once both rims are at the same temperature, the secondary rim will be arranged in an interference fit with respect to the primary rim and will inwardly compress the primary rim.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control moment gyroscope assembly comprising:
    a rotor including a shaft, a primary rim and a web connecting the shaft to the primary rim, the rotor comprising a metal material and being adapted to spin about the shaft; and
    a secondary rim configured as a single ring, comprised of the metal material and disposed around the rotor, the secondary rim configured to compress the rotor in a direction of the shaft, wherein the secondary rim is welded to the primary rim.

2. The control moment gyroscope assembly of claim 1, wherein the web is connected to the shaft via a weld joint, and wherein the secondary rim is configured to compress the rotor in a manner that places the weld joint in compression.

3. The control moment gyroscope assembly of claim 2, wherein the secondary rim is configured to compress the rotor in a manner that maintains the weld joint in compression as the rotor spins.

4. The control moment gyroscope assembly of claim 1, wherein the web is connected to the primary rim via a weld joint, and wherein the secondary rim is configured to compress the rotor in a manner that places the weld joint in compression.

5. The control moment gyroscope assembly of claim 4, wherein the secondary rim is configured to compress the rotor in a manner that maintains the weld joint in compression as the rotor spins.

6. The control moment gyroscope assembly of claim 1, wherein the secondary rim is disposed around and adjacent an outer surface of the primary rim.

7. The control moment gyroscope assembly of claim 6, wherein the secondary rim is in an interference fit with the primary rim.

8. The control moment gyroscope assembly of claim 6, wherein the secondary rim is thermally coupled to the primary rim.

9. The control moment gyroscope assembly of claim 1, wherein the metal material is steel.

10. The control moment gyroscope assembly of claim 1, wherein the web is configured as a shell.

11. The control moment gyroscope assembly of claim 1, wherein the web is configured as a disc.

12. The control moment gyroscope assembly of claim 1, wherein the secondary rim is welded to the rotor.

13. The control moment gyroscope assembly of claim 1, wherein the secondary rim is disposed around the primary rim and wherein the primary rim includes a swaged lip that inhibits the secondary rim from separating from the primary rim.

14. The control moment gyroscope assembly of claim 1, wherein the secondary rim is disposed around the primary rim and wherein the primary rim includes a shoulder that inhibits the secondary rim from separating from the primary rim.

15. A control moment gyroscope assembly comprising:
    a rotor including a shaft, a primary rim, a web disposed between the shaft and the primary rim, a first weld joint joining the web to the shaft and a second weld joint joining the web to the primary rim, the rotor comprising steel and being adapted to spin about the shaft; and
    a secondary rim configured as a single ring, comprised of steel and thermally coupled to the primary rim such that the primary rim and the secondary rim are in an interference fit with respect to one another and wherein the interference fit causes the secondary rim to compress the rotor in a direction of the shaft such that the first weld joint and the second weld joint are in compression as the rotor spins, the secondary rim also welded to the primary rim.

16. The control moment gyroscope assembly of claim 15, wherein the web is configured as a shell.

17. The control moment gyroscope assembly of claim 15, wherein the web is configured as a disc.

* * * * *